(12) United States Patent
Maris

(10) Patent No.: US 6,422,732 B1
(45) Date of Patent: Jul. 23, 2002

(54) DEVICE FOR THE EXTRACTION OF UNDESIRED SUBSTANCES FROM AN EXTRUDER

(75) Inventor: Gianfranco Maris, Collegno (IT)

(73) Assignee: F. LLI Maris S.p.A. (IT)

( * ) Notice: Subject to any disclaimer, the term of this patent is extended or adjusted under 35 U.S.C. 154(b) by 0 days.

(21) Appl. No.: 09/613,661

(22) Filed: Jul. 11, 2000

(30) Foreign Application Priority Data

Jul. 12, 1999 (IT) .......................... TO99A0607

(51) Int. Cl.$^7$ .............................. B29C 45/63
(52) U.S. Cl. .................. 366/75; 425/203; 425/812; 425/204; 425/DIG. 60
(58) Field of Search ................. 366/75, 76.1, 76.3, 366/76.4, 79, 83, 84, 85, 86; 425/DIG. 60, 204, 203, 207, 208, 209, 812

(56) References Cited

U.S. PATENT DOCUMENTS

| | | | | |
|---|---|---|---|---|
| 3,535,737 A | * | 10/1970 | Hendry | |
| 3,563,514 A | * | 2/1971 | Shattuck | |
| 3,572,647 A | * | 3/1971 | Staheli | |
| 3,917,507 A | * | 11/1975 | Skidmore | |
| 3,985,348 A | * | 10/1976 | Skidmore | |
| 4,110,843 A | * | 8/1978 | Skidmore | |
| 4,130,901 A | * | 12/1978 | Borovikova et al. | |
| 4,260,264 A | * | 4/1981 | Maki et al. | |
| 4,474,473 A | * | 10/1984 | Higuchi et al. | |
| 4,752,135 A | * | 6/1988 | Loomans | |
| 4,763,569 A | * | 8/1988 | Wenger et al. | |
| 4,776,784 A | * | 10/1988 | Batiuk | |
| 4,846,054 A | * | 7/1989 | Mange et al. | |
| 5,030,080 A | * | 7/1991 | Fukuda et al. | |
| 5,297,864 A | * | 3/1994 | Knoll et al. | |
| 5,626,420 A | * | 5/1997 | Deal et al. | |
| 5,662,415 A | * | 9/1997 | Gisko | |
| 6,030,203 A | * | 2/2000 | Kuroda | |
| 6,068,466 A | * | 5/2000 | Morita | |

* cited by examiner

Primary Examiner—Tony G. Soohoo
(74) Attorney, Agent, or Firm—Myers Bigel Sibley & Sajovec

(57) ABSTRACT

The device for extracting undesired substances, such as volatile components of low molecular weight, free gases, liquids and the like, from the cylinder of an extruder, in particular for thermoplastic materials, includes a casing defining internally an oblong cavity communicating at one end with the internal cavity of the extruder; at least one screw mounted for rotation in the oblong cavity, substantially parallel to the longitudinal axis thereof; and vacuum means for creating a depression in the oblong cavity. The longitudinal axis of the oblong cavity forms an angle of between 0° and −45° with a horizontal plane passing through the axis of the cylinder of the extruder.

9 Claims, 2 Drawing Sheets

DEVICE FOR THE EXTRACTION OF UNDESIRED SUBSTANCES FROM AN EXTRUDER

RELATED APPLICATION

This application claims the benefit of Italian Patent Application No. TO99A000607, filed Jul. 12, 1999.

BACKGROUND

The present invention relates to a device for extracting undesired substances, such as volatile components of low molecular weight, free gases, liquids and the like from the cylinder of an extruder, in particular for the processing of thermoplastic materials. These substances develop in the extruder during mixing and stabilization processes and during other processes involving chemical reactions.

SUMMARY OF THE INVENTION

In more detail, the extractor device includes:
- a casing defining internally an oblong cavity communicating at one end with the inner cavity of the cylinder of the extruder,
- at least one screw mounted for rotation inside the said oblong cavity, substantially parallel to the longitudinal axis thereof, and
- vacuum means operable to cause a depression in the said oblong cavity.

In a technique known in the prior art, such a device is mounted in such a way that the longitudinal axis of the oblong cavity lies substantially vertically over the extruder, with the axis of the cylinder thereof lying substantially horizontally.

In operation, undesired substances are extracted through the casing by vacuum means, while the thermoplastic material is retained in the extruder by rotation of the screws.

Meanwhile, the undesired extracted substances tend to condense and to fall, due to the force of gravity and to the vertical arrangement of the casing, back into the extruder, thus contaminating the thermoplastic material being processed.

In order to overcome such drawback, the subject matter of the present invention is a device of the type described at the start of this description, wherein the longitudinal axis of the oblong cavity forms an angle of between 0° and −45°, preferably of between 0° and −15°, with a horizontal plane passing through the axis of the cylinder of the extruder.

According to the invention, the horizontal or downward inclination of the axis of the oblong casing prevents the condensed undesired substances from falling back into the extruder, but retains them in the extractor device. At the same time, rotation of the screws is sufficient to keep the thermoplastic material being processed in the extruder. In this way, undesired substances are efficiently separated from the thermoplastic material without any undue effect on the processing thereof.

According to requirements, the cavity of the device of the invention can be designed to accommodate a single rotatable screw or two or more interpenetrating rotatable screws.

An additional object of the present invention is constituted by an extruder, e.g. of a single screw or twin screw type, associated with an extractor device of the type just described.

Further characteristics and advantages of the present invention will become apparent from the detailed description which follows, given with reference to the appended drawings, provided purely by way of non-limitative example, in which:

DETAILED DESCRIPTION OF THE INVENTION

Figure 1:
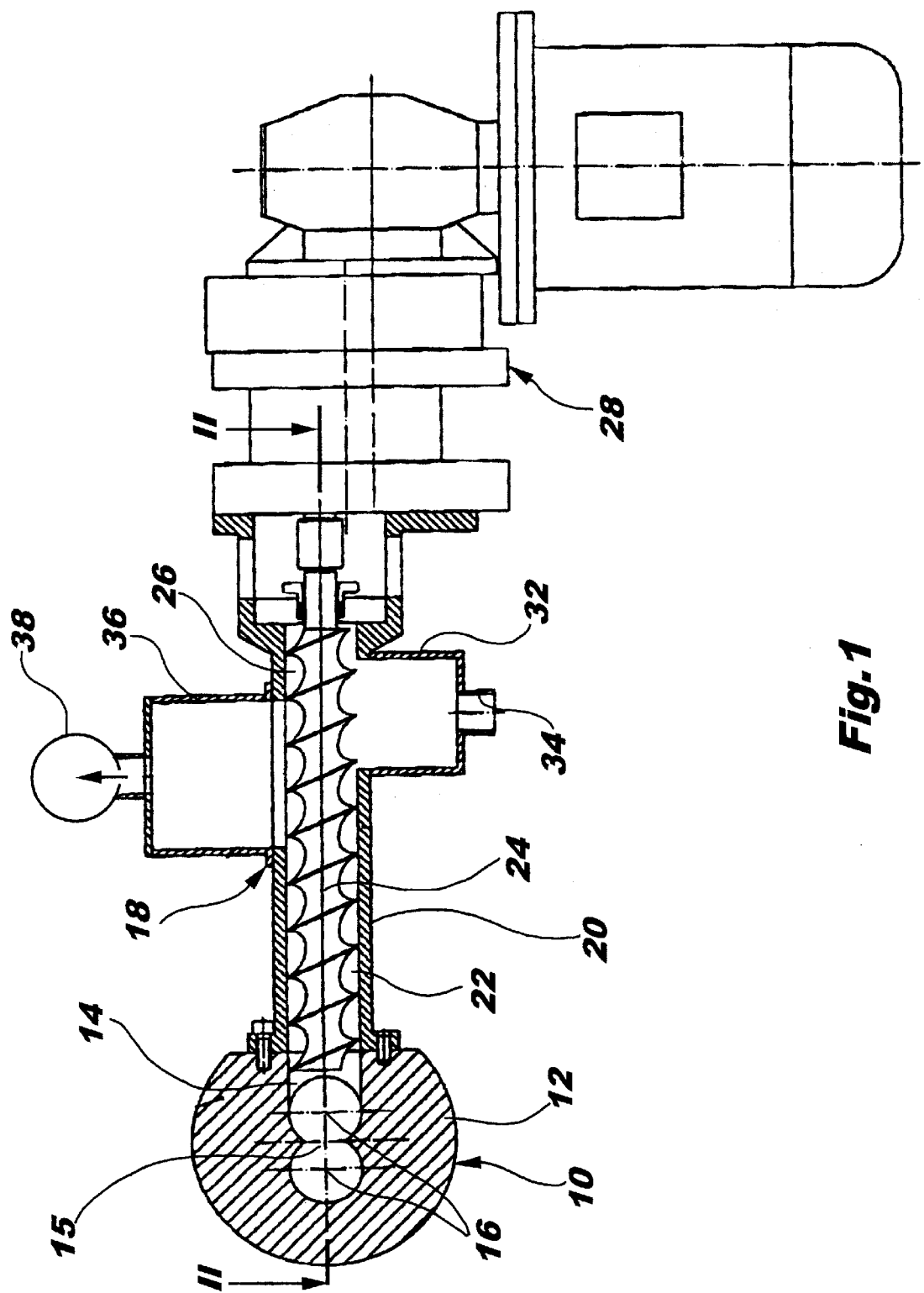
FIG. 1 is a schematic, sectioned elevation of a device of the invention fitted to an extruder.
Figure 2:
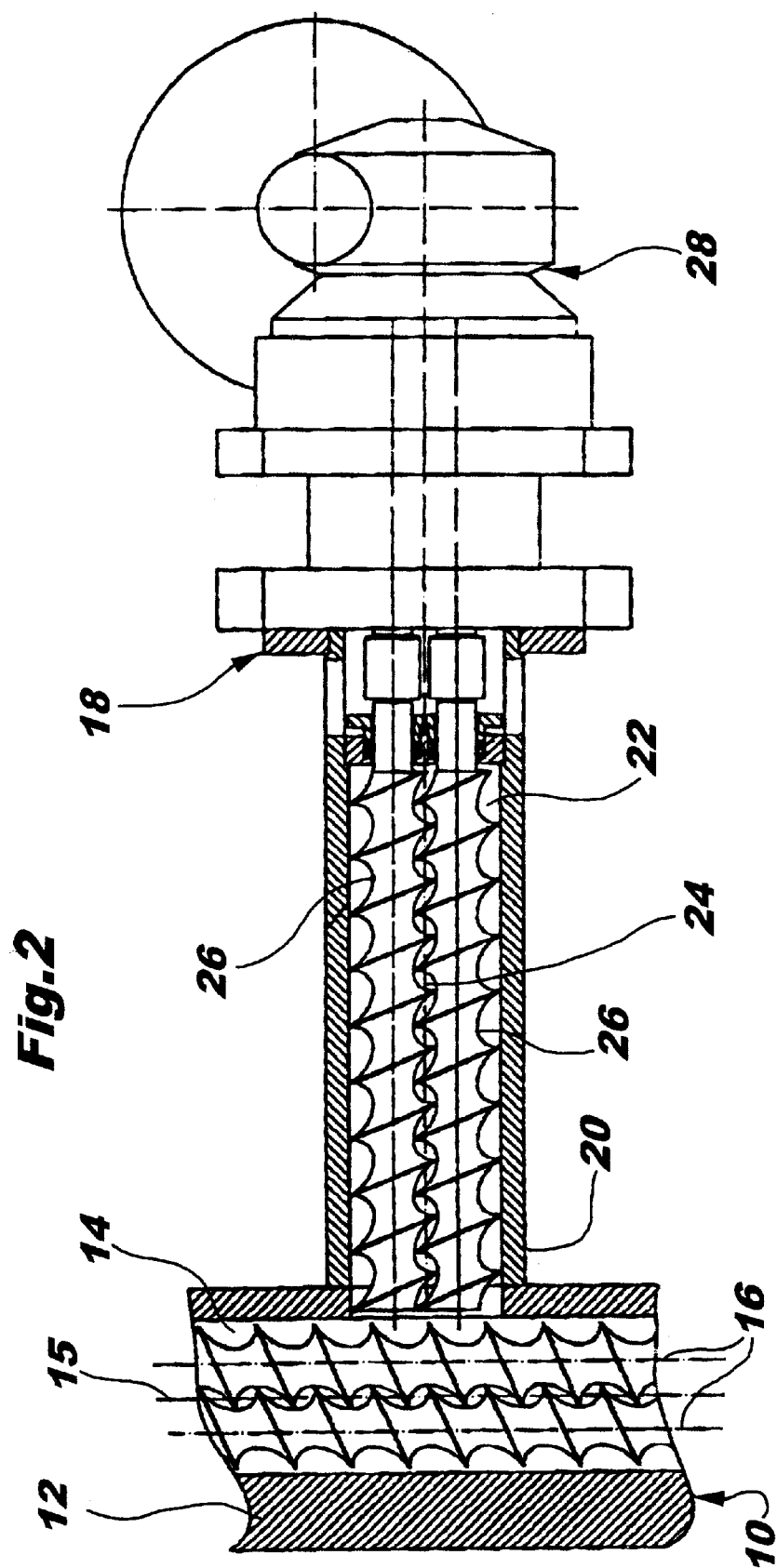
FIG. 2 shows a section taken on the line II—II of FIG. 1.

A twin screw extruder for processing thermoplastics materials is indicated 10 in the drawings. This extruder includes a per se known cylinder 12 with an internal cavity 14 in which two screws 16 are mounted parallel to the axis 15 of the cylinder 12, for rotation in a substantially horizontal plane.

A device 18 for extracting undesired substances, such as volatile components of low molecular weight, free gases, liquids and the like, from the thermoplastic material being processed in the extruder, is associated with the extruder 10.

This device 18 includes a tubular casing 20 which defines inside an oblong internal cavity 22 communicating at one end with the cavity 14 of the extruder 10. Two interpenetrating screws 26 are mounted in the cavity 22, substantially parallel to the longitudinal axis 24 thereof. The said screws are rotatable by means of a per se known actuator device, generally indicated 28.

The longitudinal axis 24 of the oblong cavity 22 lies in the same horizontal plane which passes through the axis 15 of the cylinder 12 of the extruder 10 and forms a right angle thereto.

In other embodiments of the invention, not shown, the longitudinal axis 24 can form an angle of between 0° and −45° with the horizontal plane passing through the axis 15 of the cylinder 12 of the extruder 10, while its projection onto the said horizontal plane can form an angle of between 75° and 105° with the axis 15.

A recess 32 with a discharge aperture 34 protrudes from the bottom of the oblong cavity 24, while a chamber 36 protrudes from the top, with extraction means in the form of a vacuum pump 38 arranged on top of this.

During operation of the extruder 10, a mass of molten thermoplastic material is pushed along the cavity 14 by the rotation of the screws 16. Volatile components with a low molecular weight, gas and liquid are generated during this process and evacuated through the cavity 22 of the casing 20 as a result of the extracting action of the vacuum pump 38.

At the same time, the rotation of the screws 26 keeps the thermoplastic material inside the cylinder 12, preventing it from moving through the cavity 22. In order to achieve this, the screws 26 should rotate in the same sense as the screws 16 of the extruder 10, while the extractor device 18 should be mounted on the side of the extruder 10 compatible with this sense of rotation. In other words if, for example, the screws 16 are rotating clockwise, the screws 26 should also rotate clockwise and the device 18 should be mounted on the right-hand side (viewed by an observer facing the extrusion aperture) of the extruder 10.

The undesired substances extracted from the cylinder 12 are conveyed to the chamber 36 where they condense as a result of the drop in speed and in temperature and fall into the recess 32 from where they can be regularly removed through the discharge aperture 34.

In this way, the substances do not contaminate the thermoplastic material being processed but can be eliminated without disrupting the extrusion process.

Naturally, the principle of the invention remaining unchanged, manufacturing details and embodiments may vary widely from those described and illustrated, purely by way of non-limitative example, without departing thereby from the scope of the invention.

What is claimed is:

1. An extruder comprising:

an extruder cylinder having an internal cavity; a device for extracting undesired substances, such as volatile components of low molecular weight, free gases, liquids and the like from the cylinder of an extruder, in particular for thermoplastic materials, said device comprising:

a tubular casing defining within it an oblong cavity, at least one screw mounted for rotation inside the oblong cavity, substantially parallel to the longitudinal axis thereof, vacuum means operable to cause a depressurization of said oblong cavity, wherein said casing is configured for communicating at one end with the internal cavity of the cylinder of an extruder such that the longitudinal axis of said oblong cavity of said casing forms an angle of between 0° and −45° with the horizontal plane passing through the axis of the cylinder of the extruder.

2. A device according to claim 1, in which the longitudinal axis of the said oblong cavity forms an angle of between 0° and −15° with a horizontal plane passing through the axis of the cylinder of the extruder.

3. A device according to claim 1, in which a recess protrudes from the bottom of the said oblong cavity for collecting the condensed undesirable substances.

4. A device according to claim 3, in which the said recess has a discharge aperture.

5. A device according to claim 1, in which a chamber protrudes from the top of the oblong cavity, with extraction means arranged at the top thereof.

6. A device according to claim 5, characterised in that the said extraction means include a vacuum pump.

7. A device according to claim 1, characterised in that the projection of the longitudinal axis of the cavity onto a horizontal plane passing through the axis of the cylinder forms an angle of between 75° and 105° with the said axis.

8. A device according to claim 1, which includes a single screw mounted for rotation in the cavity.

9. A device according to claim 1, which includes two or more interpenetrating screws, mounted for rotation in the cavity.

* * * * *